(12) United States Patent
Nakatani

(10) Patent No.: US 6,769,824 B2
(45) Date of Patent: Aug. 3, 2004

(54) CAMERA SUPPORT

(75) Inventor: Kouichiro Nakatani, Tokyo (JP)

(73) Assignee: Nihon Velbon Seiki Kogyo Kabushiki Kaisha, Tokyo (JP)

(*) Notice: Subject to any disclaimer, the term of this patent is extended or adjusted under 35 U.S.C. 154(b) by 97 days.

(21) Appl. No.: 10/168,399

(22) PCT Filed: Apr. 24, 2001

(86) PCT No.: PCT/JP01/03495

§ 371 (c)(1),
(2), (4) Date: Jun. 21, 2002

(87) PCT Pub. No.: WO02/084396

PCT Pub. Date: Oct. 24, 2002

(65) Prior Publication Data

US 2004/0096207 A1 May 20, 2004

(30) Foreign Application Priority Data

Apr. 9, 2001 (JP) .................................... 2001-109852

(51) Int. Cl.⁷ .............................................. G03B 17/00
(52) U.S. Cl. ..................... 396/419; 396/420; 396/428
(58) Field of Search ................................ 396/419, 420, 396/428

(56) References Cited

U.S. PATENT DOCUMENTS

| | | | | |
|---|---|---|---|---|
| 1,803,347 A | * | 5/1931 | Owens | ....................... 396/419 |
| 3,731,897 A | * | 5/1973 | Price | ....................... 248/230.1 |
| 4,693,575 A | * | 9/1987 | Keller | ....................... 396/420 |
| 5,411,313 A | * | 5/1995 | Counihan et al. | ........... 297/118 |
| 5,865,406 A | * | 2/1999 | Teeple | ...................... 248/163.1 |
| 6,021,984 A | * | 2/2000 | Mills | ....................... 248/219.4 |
| 6,579,017 B2 | * | 6/2003 | Wei | ............................ 396/428 |

FOREIGN PATENT DOCUMENTS

| JP | 58-092597 | 6/1983 |
|---|---|---|
| JP | 05-037757 | 12/1994 |

\* cited by examiner

*Primary Examiner*—David M. Gray
(74) *Attorney, Agent, or Firm*—Morrison & Foerster LLP

(57) ABSTRACT

A camera support (10) has a mounting member (13) to be attached to a camera (11), and a supporting member (14) for supporting the camera (11) through the mounting member (13). The supporting member (14) has a catching surface (22) in the shape of an arcuate surface and a fitting surface (24) in the shape of a cylindrical surface. The mounting member (13) has a catching surface (32) and one or more fitting surfaces (36). The catching surface (32) is adapted to removably catch the catching surface (22). Each fitting surface (36) is adapted to removably be fitted to the fitting surface (24). By engaging the catching surface (22) with the catching surface (32), the camera (11) is set in the horizontal position in such a state as to be capable of rotating vertically so that its vertical angle can be adjusted. By fitting the fitting surface (24) and one of the fitting surface (36) together, the camera (11) is set in the vertical position in such a state as to be capable of rotating vertically so that its vertical angle can be adjusted.

4 Claims, 4 Drawing Sheets

CAMERA SUPPORT

TECHNICAL FIELD

The present invention relates to a camera support for supporting a camera.

BACKGROUND OF THE INVENTION

An example of conventional camera supports is shown in FIG. 5

The conventional camera support shown in FIG. 5 is provided with a dome-shaped mounting member 3 and a supporting member 4. The mounting member 3 is attached to a camera 1 with a screw 2, and the supporting member 4 is adapted to support the camera 1 with the mounting member 3 disposed therebetween. The supporting member 4 consists of a slender, vertically extending vertical rod portion 5 and a ball-shaped portion 6 fixed to the top of the vertical rod portion 5.

As the ball-shaped portion 6 of the supporting member 4 is snugly fitted in the dome-shaped mounting member 3, the camera 1, which is in the horizontal position, is supported in such a manner as to be capable of adjustably rotating around the ball-shaped portion 6 vertically, laterally or in any other desired direction.

With the camera support shown in FIG. 5, the image can laterally be angled in accordance with the subject to be photographed by laterally rotating the camera 1 that is in the horizontal position around the ball-shaped portion 6. However, it is not possible to shift the camera 1 from the horizontal position to the vertical position even if the camera 1 is to a great degree.

In order to solve the above problem, an object of the present invention is to provide a camera support which is capable of shifting the camera between the horizontal position and the vertical position.

DISCLOSURE OF THE INVENTION

A camera support according to the present invention includes a mounting member to be attached to a camera, and a supporting member for supporting the camera with the mounting member therebetween, wherein said supporting member includes a first supporting portion and a second supporting portion, the first supporting portion adapted to support the camera in a horizontal position by engagement with the mounting member, and the second supporting portion adapted to support the camera in a vertical position by engagement with the mounting member.

With the configuration as above, the invention enables the camera to be set in the horizontal position or the vertical position as desired in accordance with the subject to be photographed.

A camera support according to the present invention includes a mounting member to be attached to a camera, and a supporting member for supporting the camera with the mounting member therebetween, said supporting member having a catching surface in the shape of an arcuate surface and a fitting surface in the shape of a cylindrical surface, and said mounting member having another catching surface adapted to be slidably engaged with or separated from the first mentioned catching surface, and another fitting surface adapted to be slidably fitted to or separated from the first mentioned fitting surface, wherein the camera support functions such that when the first mentioned catching surface and the second mentioned catching surface are engaged with each other, the camera is supported in the horizontal position by the supporting member in such a state as to be capable of being adjusted by rotating vertically around the first mentioned catching surface and that when the first mentioned fitting surface and the second mentioned fitting surface are fitted to each other, the camera is supported in the vertical position by the supporting member in such a state as to be capable of being adjusted by rotating vertically around the first mentioned fitting surface.

With the configuration as above, the invention enables the camera to be set in the horizontal position or the vertical position as desired in accordance with the subject to be photographed. Furthermore, the camera can easily be tilted no matter whether the camera is in the horizontal position or in the vertical position.

According to yet another feature of the invention, the second mentioned fitting surface of the mounting member of the camera support consists of a plurality of fitting surfaces that are aligned at given distances from each other.

With the feature as above, the invention can appropriately cope with various cameras by choosing one from the fitting surfaces depending on the camera.

According to yet another feature of the invention, the supporting member of the camera support has a slender, horizontally extending horizontal rod portion with a circular cross section and a slender, vertically extending vertical rod portion projected downward from a location in the middle of the length of the underside of the horizontal rod portion; the upper part of the cylindrical outer surface of the horizontal rod portion forms the first mentioned catching surface in the shape of an arcuate surface; and the entire cylindrical surface of at least one of the lengthwise ends of the horizontal rod portion forms the first mentioned fitting surface in the shape of a cylindrical surface.

With the feature as above, the invention the invention makes the supporting member easy to manufacture and also makes the supporting member easy to carry by using the horizontal rod portion.

According to yet another feature of the invention, the supporting member of the camera support has a structure such a structure as to permit the supporting member to be used as a walking stick.

By enabling the supporting member to be used as a walking stick, the invention eliminates the need of a walking stick as a separate item from the supporting member, resulting in various benefits, such as, for example, reducing baggage when traveling.

PREFERRED EMBODIMENT OF THE INVENTION

Next, an embodiment of the present invention is explained hereunder, referring to the relevant drawings.

Figure 1:
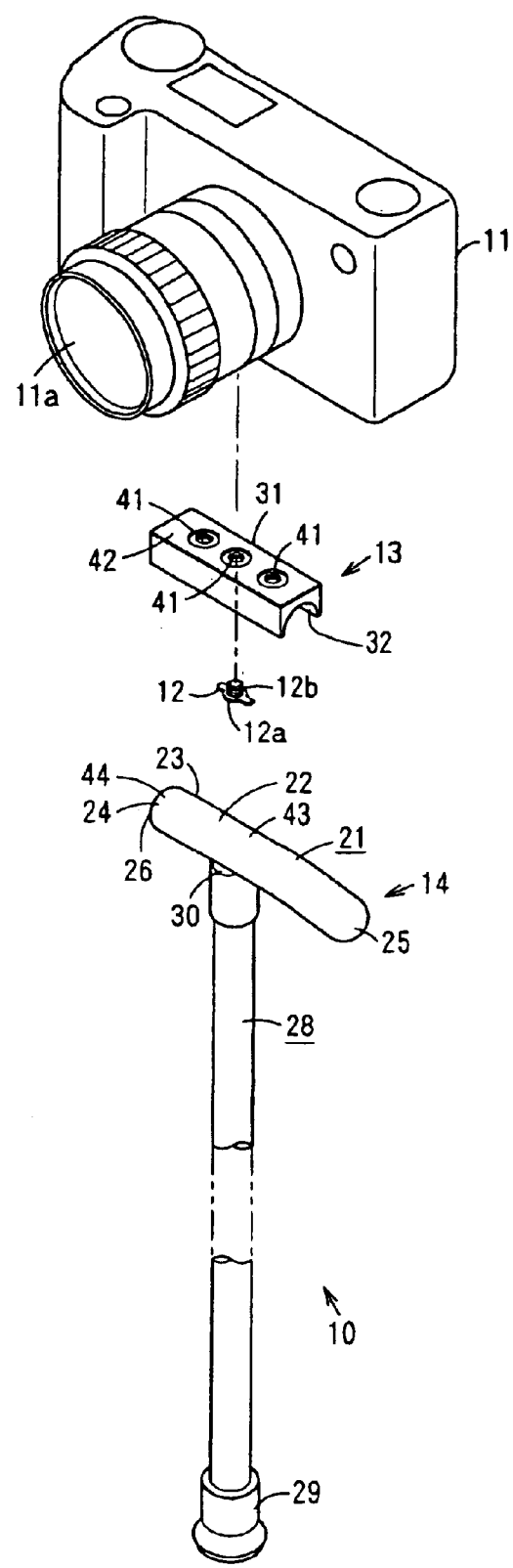
FIG. 1 is a perspective of an embodiment of a camera support according to the present invention.

Referring to FIG. 1, numeral 10 denotes a camera support 10 having a mounting member 13 and a supporting member 14. With a screw 12 serving as a fixture, the mounting member 13 is attached to the underside of a camera 11 having a somewhat longer horizontal dimension, and the supporting member 14 is intended to support the camera 11 with the mounting member 13 disposed therebetween.

As shown in FIG. 1, the supporting member 14 is a support-stick that functions both as a support of the camera 11 and as a walking stick, and has a horizontal rod portion 21 serving as a stick holder. The horizontal rod portion 21 is formed in the shape of a horizontally extending solid cylinder with a circular cross section having a uniform diameter.

The upper part of the outer surface of the horizontal rod portion 21 forms a catching surface 22 in the shape of a convex arcuate surface having an arc corresponding to, for example, approximately three-fourths of the circumference. In other words, the upper part of the cylindrical outer surface of the horizontal rod portion 21 (for example, approximately three-fourths of the entire cylindrical outer surface, which part excludes the bottom part of the outer surface of the horizontal rod portion 21, forms the catching surface 22, which is one of the two catching surfaces and has an arcuate surface with a generally C-shaped cross section and a horizontally extending center axis. Said center axis is an imaginary line passing through the centers of the arcs that form cross sections of the catching surface 22.

One of the two lengthwise ends of the horizontal rod portion 21 forms a fitting portion 23 in the shape of a short, solid cylinder. The entire cylindrical outer surface of the fitting portion 23 forms a fitting surface 24, which is a cylindrical surface having a uniform diameter. The fitting surface 24 and the aforementioned catching surface 22 coaxially extend so that the center axis of the fitting surface 24, which is an imaginary line passing through the centers of circles that form cross sections of the fitting surface 24, coincides with the center axis of the catching surface 22. A part (the upper part of the outer surface) of the fitting surface 24 serves as a part of the catching surface 22.

The vicinity of the other lengthwise end of the horizontal rod portion 21 is slightly curved downward so that the horizontal rod portion 21 becomes more comfortable to hold, the surface of the other end is formed into a hemi-spherical curved surface 25. The first mentioned lengthwise end forms a vertically extending flat surface 26.

A slender, vertically extending vertical rod portion 28 which serves as a stick-leg portion and has a circular cross section projects downward from the underside of the horizontal rod portion 21, from a location in the middle of the length of the horizontal rod portion 21 (for example, slightly closer to the first lengthwise end than is the midpoint of the length of the horizontal rod portion 21. A rubber cap 29 serving as a shoe spike is fitted over the bottom portion of the vertical rod portion 28. A pair of slanted surfaces 30,30 having a generally crescent shape are formed by cutting away the cylindrical outer surface of the upper end portions of the vertical rod portion 28 at two locations.

As shown in FIG. 1, the mounting member 13 has a caved body portion 31 open at the bottom. The body portion 31 has a shape that is formed by cutting a hemi-cylinder having an approximately hemi-circular cross section from the lower part of a horizontally extending rectangular block having nearly the same length as that of the horizontal rod portion 21.

The underside of the body portion 31 forms another catching surface 32, which is in the shape of a concave arc open downward and corresponding to the shape of the first mentioned catching surface 22. In the case of the present embodiment, the arc of the catching surface 32 corresponds to about a half of the circumference. The catching surface 32 extends from one end to the other end of the body portion 31 and has a horizontally extending center axis, which is an imaginary line connecting the centers of the arcs of the catching surface 32. The catching surface 32 can be fitted in or separated from the catching surface 22 by sliding along the catching surface 22.

Figure 2:
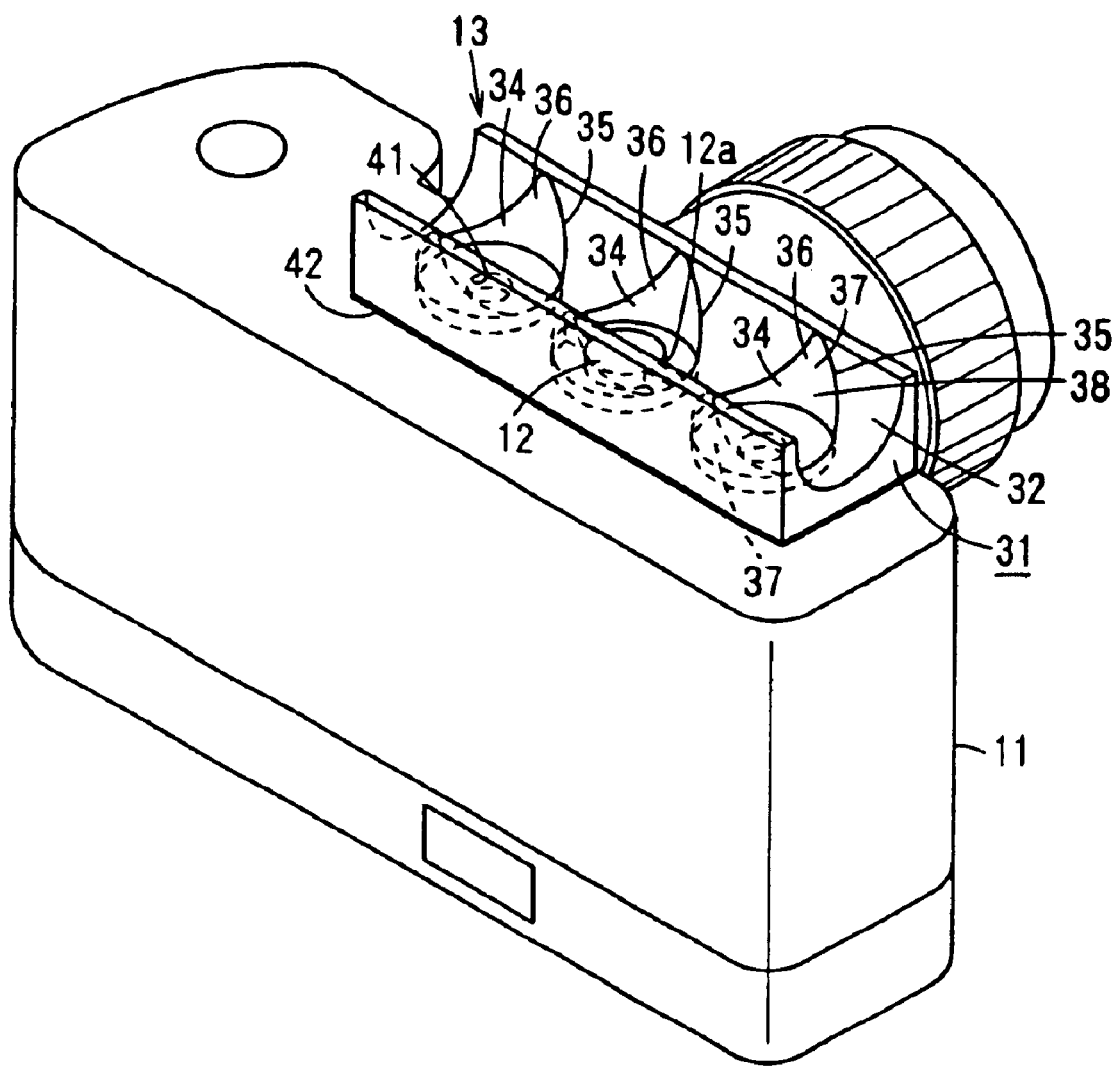
FIG. 2 is a perspective of a mounting member of said camera support.

As shown in FIG. 2, a plurality of recesses (for example three circular recesses 34,34,34) are formed in the catching surface 32, which is the underside of the body portion 31, in such a manner as to be spaced apart in the lengthwise direction of the body portion 31 at regular intervals or otherwise at given distances from each other.

Of the body portion 31, the periphery of each recess 34 forms another fitting portion 35 which has a cylindrical shape and can removably be fitted over the aforementioned fitting portion 23. The outer diameter of the fitting portion 23 is slightly smaller than the inner diameter of each fitting portion 35.

The lower part of the cylindrical inner surface of each fitting portion 35 forms a fitting surface 36. According to the embodiment, each fitting surface 36 is formed of a pair of generally triangular, arcuate surfaces 37,37 that are spaced apart and face each other. Each one of the two edges of each arcuate surface 37 is formed of an arc which may be, for example, approximately an eighth of a circle. A ring-shaped cylindrical surface 38 integrally extends from the edges of each arcuate surface 37.

The fitting surfaces 36 can be slidably fitted around or separated from the aforementioned fitting surface 24.

The body portion 31 is also provided with a plurality of through holes for screws. For example, three circular through holes 41,41,41 are provided in the case of the present embodiment. The through holes 41,41,41 are formed at locations respectively corresponding to the recesses 34,34,34. In other words, they are arranged along the length of the body portion 31 at regular intervals or otherwise at given distances from each other. Each through hole 41 is provided coaxially with the corresponding recess 34, with the diameter of the through hole 41 smaller than that of the recess 34.

A rectangular anti-slipping seat member 42 is attached to the top of the body portion 31. The head 12a of the screw 12 has a thickness nearly the same as the axial length of the cylindrical surface 38.

The catching surface 22 of the supporting member 14 forms a first supporting portion 43 for supporting the camera 11 at the horizontal position by contact between the catching surface 22 and the catching surface 32 of the mounting member 13. The fitting surface 24 of the supporting member 14 forms a second supporting portion 44 for supporting the camera 11 at the vertical position by being snugly fitted to the fitting surfaces 36 of the mounting member 13.

Next, the function of the embodiment described above is explained hereunder.

To take pictures with the camera 11, the user inserts the screw 12 into the through hole 41 selected from among the three through holes 41,41,41 for a screw, and screws the external thread portion 12b of the screw 12 in the internal thread portion (not shown) in the underside of the camera 11, thereby fixing the mounting member 13 to the camera 11 in the state that the anti-slipping seat member 42 is in contact with the underside of the camera 11.

The user makes the aforementioned selection of the through hole 41 in accordance with the location of the internal thread portion of the camera 11 so as to, for example, prevent the lengthwise ends of the mounting member 13 from protruding from the sides of the camera 11.

Figure 3:
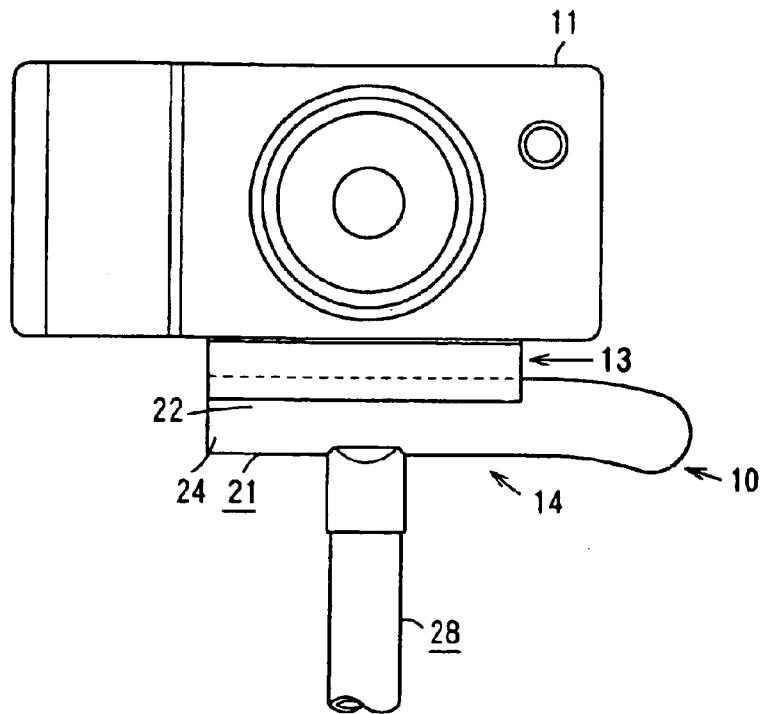
FIG. 3 illustrates how a camera is supported in the horizontal position by said camera support.
Figure 4:
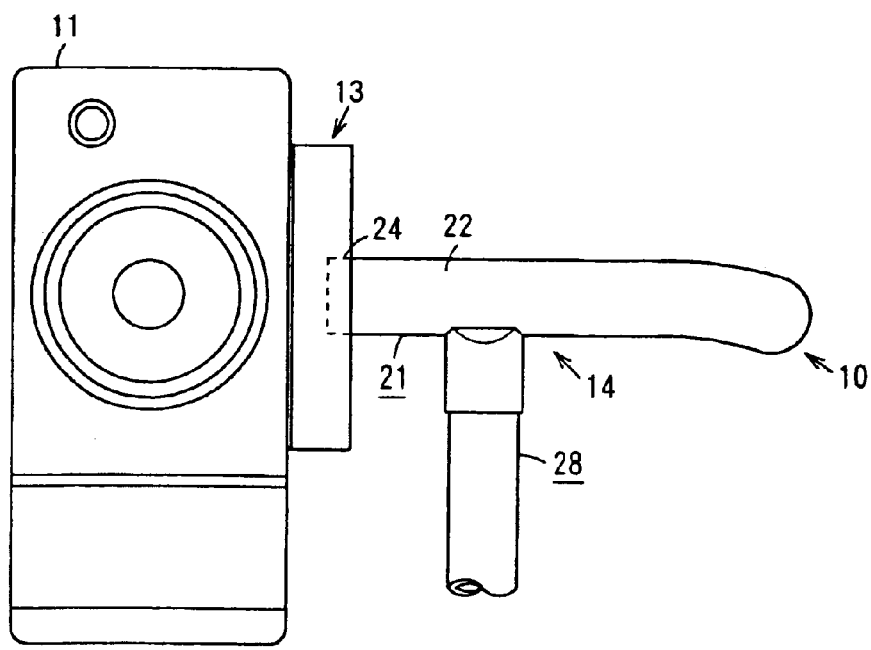
FIG. 4 illustrates how a camera is supported in the vertical position by said camera support.
Figure 5:
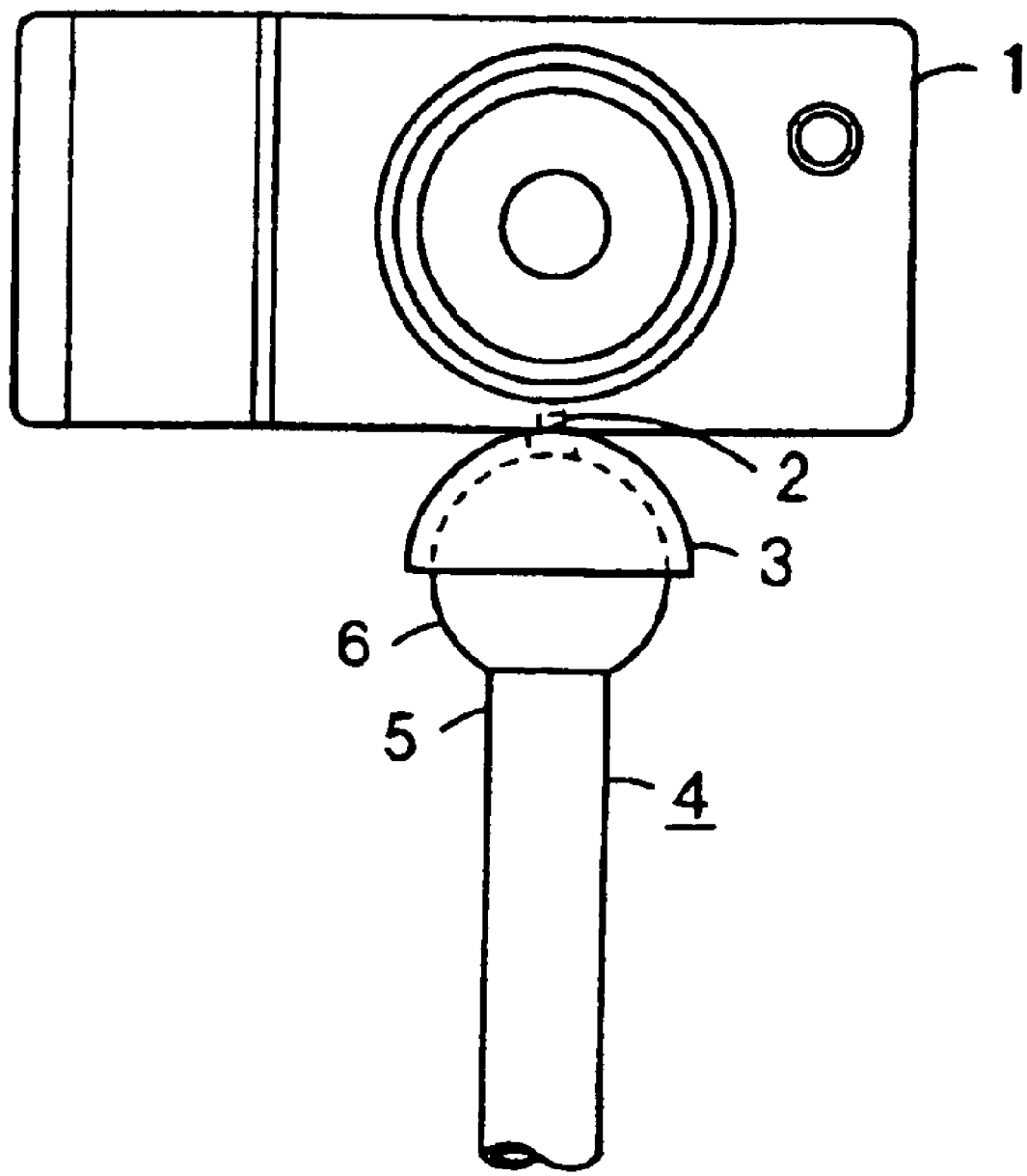
FIG. 5 is a front view of a conventional camera support.

To take pictures with the camera 11 in the horizontal position as shown in FIG. 3 after attaching the mounting member 13 to the camera 11, the user supports the supporting member 14 with one hand so that the vertical rod portion 28 is positioned vertically, and holds the camera 11 horizontally with the other hand. Then, the user places the camera 11 on the supporting member 14 with the mounting member 13 therebetween to bring the catching surface 22 of the supporting member 14 and the catching surface 32 of the mounting member 13 into contact with each other in the state that the two catching surfaces 22,32 can slide on each other.

As a result, with the mounting member 13 positioned between the supporting member 14 and the camera 11, the supporting member 14 supports the camera 11 in the horizontal position where the lengthwise direction of the camera 11 is horizontal. In this state, the camera 11 can be vertically rotated around the catching surface 22 of the supporting member 14 so that the camera lens 11, which projects in the forward direction, rotates vertically.

Thereafter, the user may tilt the camera 11 by rotating the camera 11 vertically according to the subject to be photographed. When a desired image is obtained, the user releases the shutter.

There may be cases where the user is unable to obtain a desired image by the horizontal position. To take a picture with the camera 11 in the vertical position in such a case, first, the user raises the camera 11 together with the mounting member 11 so as to release the catching surface 22 of the supporting member 14 from the catching surface 32 of the mounting member 13.

Thereafter, the user supports the supporting member 14 with one hand so that the vertical rod portion 28 is positioned vertically, and holds the camera 11 vertically with the other hand. Then, the user inserts the fitting portion 23 of the supporting member 14 into the selected fitting portion 35 so that the fitting surface 24 of the supporting member 14 is slidably fitted in the fitting surface 36.

As a result, with the mounting member 13 positioned between the supporting member 14 and the camera 11, the supporting member 14 supports the camera 11 in the vertical position where the lengthwise direction of the camera 11 is vertical. In this state, the camera 11 can be vertically rotated around the fitting surface 24 of the supporting member 14 so that the camera lens 11, which projects in the forward direction, rotates vertically.

Thereafter, the user may tilt the camera 11 by rotating the camera 11 vertically according to the subject to be photographed. When a desired image is obtained, the user releases the shutter.

To use the supporting member 14 as a walking stick after shooting with the camera 11 in the vertical position, the user separates the fitting surface 24 of the supporting member 14 from the fitting surface 36 of the mounting member 13, and, while holding the horizontal rod portion 21 of the supporting member 14, uses the vertical rod portion 28 in such a way that the cap 29 at the bottom of the vertical rod portion 28 comes into contact with the ground or the like.

As described above, the present embodiment functions such that when the camera 11 is supported by the supporting member 14 with the mounting member 13 therebetween by means of slidable contact between the catching surface 22 of the supporting member 14 and the catching surface 32 of the mounting member 13, the camera 11 is set in the horizontal position and capable of tilting, and that when the camera 11 is supported by the supporting member 14 with the mounting member 13 therebetween by means of slidable contact between the fitting surface 24 of the supporting member 14 and one of the fitting surfaces 36 of the mounting member 13, the camera 11 is set in the vertical position and capable of tilting. With the structure as above, the embodiment enables the camera 11 to be set in the horizontal position or the vertical position as desired in accordance with the subject to be photographed.

Furthermore, tilting adjustment can easily be performed by rotating the camera 11 in the circumferential direction along the catching surface 22 when the camera 11 is in the horizontal position, or rotating the camera 11 in the circumferential direction along the fitting surface 24 when the camera 11 is in the vertical position.

As the camera 11 can easily be attached to the supporting member 14 with the mounting member 13 therebetween, the position of the camera 11 can also be easily changed from the horizontal position to the vertical position or from the vertical position to the horizontal position.

As a plurality of fitting surfaces 36 (three fitting surfaces in the case of the present embodiment) are arranged at regular intervals along the lengthwise direction of the body portion 31 of the mounting member 13, the mounting member 13 of the embodiment can appropriately cope with various cameras 11 by choosing one from the fitting surfaces 36 according to the dimensions of the camera 11, the position of the internal thread portion or any other relevant factors.

The supporting member 14 has a simple structure and is easy to produce, and also easy to carry by using the horizontal rod portion 21.

When not used for supporting the camera 11, the supporting member 14 can be used as a walking stick. Therefore, in addition to providing a benefit of not encumbering the user when it is carried, the supporting member 14 according to the embodiment reduces baggage when traveling by eliminating the necessity of a walking stick to be provided as a separate item from the supporting member 14.

It is not essential for the first supporting portion 43 to have a structure that calls for direct contact with the mounting member 13 to support the camera 11 in such a state that the camera 11 is in the horizontal position and capable of tilting; for example, the camera 11 may be supported in the horizontal position by fitting the first supporting portion 43 to the mounting member 13.

Furthermore, it is not essential for the second supporting portion 44 to have a structure that calls for fitting to the mounting member 13 to support the camera 11 in such a state that the camera 11 is in the vertical position and capable of tilting; for example, the camera 11 may be supported in the vertical position by direct contact with the mounting member 13.

Although the above explanation refers to the embodiment, wherein three fitting surfaces 36 are aligned, the invention is also applicable to cases where one, two or more than three fitting surfaces 36 are provided. Furthermore, according to the embodiment explained above, each fitting surface 36 consists of a pair of arcuate surfaces 37,37 that are spaced apart and situated facing each other. However, each fitting surface 36 may be formed of a single cylindrical surface.

The fitting surface 24 in the shape of a cylindrical surface is not limited to a complete cylindrical surface having a circular cross section; any arcuate surface having an arc (for example, approximately three-fourths of a circle) is permissible, provided that the shape enables the fitting surface 24 to fit onto the fitting surface 36 so as to properly support the camera 11.

Furthermore, the vertical rod portion 28 of the supporting member 14 may have a multi-stage structure with an adjustable length.

POSSIBLE INDUSTRIAL APPLICATION

As described above, a camera support according to the invention is capable of setting the camera 11 in the horizontal position or the vertical position as desired in accordance with the subject to be photographed, and, therefore, particularly suitable for occasions where the camera has to shoot photographs from the horizontal position and/or the vertical position.

What is claimed is:

1. A camera support including a mounting member to be attached to a camera, and a supporting member for supporting the camera with the mounting member therebetween, wherein said supporting member includes:

a first supporting portion adapted to support the camera in a horizontal position by engagement with the mounting member, a second supporting portion adapted to support the camera in a vertical position by engagement with the mounting member; and said supporting member has a catching surface in the shape of an arcuate surface and a fitting surface in the shape of a cylindrical surface;

said mounting member has another catching surface adapted to be slidably engaged with or separated from the first mentioned catching surface, and another fitting surface adapted to be slidably fitted to or separated from the first mentioned fitting surface;

when the first mentioned catching surface and the second mentioned catching surface are engaged with each other, the camera is supported in the horizontal position by the supporting member in such a state as to be capable of being adjusted by rotating vertically around the first mentioned catching surface; and when the first mentioned fitting surface and the second mentioned fitting surface are fitted to each other, the camera is supported in the vertical position by the supporting member in such a state as to be capable of being adjusted by rotating vertically around the first mentioned fitting surface.

2. A camera support as claimed in claim 1, wherein the second mentioned fitting surface of the mounting member consists of a plurality of fitting surfaces that are aligned at given distances from each other.

3. A camera support as claimed in claim 1, wherein: the supporting member has a slender, horizontally extending horizontal rod portion with a circular cross section, and a slender, vertically extending vertical rod portion projected downward from a location in the middle of the length of the underside of the horizontal rod portion;

the upper part of the cylindrical outer surface of the horizontal rod portion forms the first mentioned catching surface in the shape of an arcuate surface; and the entire cylindrical surface of at least one of the lengthwise ends of the horizontal rod portion forms the first mentioned fitting surface in the shape of a cylindrical surface.

4. A camera support as claimed in any one of the claims from claim 1 to claim 3, wherein the supporting member has a structure permitting the supporting member to be used as a walking stick.

* * * * *